(12) United States Patent
Kamiyama et al.

(10) Patent No.: US 9,709,843 B2
(45) Date of Patent: Jul. 18, 2017

(54) DISPLAY APPARATUS

(71) Applicant: Sharp Kabushiki Kaisha, Sakai-shi, Osaka (JP)

(72) Inventors: Takeshi Kamiyama, Sakai (JP); Tetsuya Maruno, Sakai (JP); Takashi Ogino, Sakai (JP); Yusuke Masuda, Sakai (JP); Michio Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/115,286

(22) PCT Filed: Feb. 5, 2015

(86) PCT No.: PCT/JP2015/053231
§ 371 (c)(1),
(2) Date: Jul. 29, 2016

(87) PCT Pub. No.: WO2015/119194
PCT Pub. Date: Aug. 13, 2015

(65) Prior Publication Data
US 2017/0010501 A1 Jan. 12, 2017

(30) Foreign Application Priority Data

Feb. 6, 2014 (JP) .................................. 2014-021641

(51) Int. Cl.
*G02F 1/1335* (2006.01)
*G02F 1/1333* (2006.01)

(52) U.S. Cl.
CPC .. *G02F 1/133512* (2013.01); *G02F 1/133308* (2013.01); *G02F 1/133615* (2013.01);
(Continued)

(58) Field of Classification Search
CPC ......... G02F 1/133512; G02F 1/133308; G02F 1/133615; G02F 2001/133317; G02F 2201/503
(Continued)

(56) References Cited

U.S. PATENT DOCUMENTS 6,795,153 B2 * 9/2004 Suzuki ................. G02F 1/1341
349/153
7,961,281 B2 * 6/2011 Tsuji ................ G02F 1/133308
349/122

(Continued)

FOREIGN PATENT DOCUMENTS

| JP | 2013-164466 A | 8/2013 |
|----|---------------|--------|
| JP | 2014-186317 A | 10/2014 |

OTHER PUBLICATIONS

Official Communication issued in International Patent Application No. PCT/JP2015/053231, mailed on Apr. 14, 2015.

*Primary Examiner* — Adrian S Wilson
*Assistant Examiner* — Abhishek Rathod
(74) *Attorney, Agent, or Firm* — Keating & Bennett, LLP

(57) ABSTRACT

A buffer member (13) which abuts on a front surface side of a panel periphery of a display panel is made of a material having a light shielding property and has a portion, which extends over substantially the whole length of a side, along at least one of the respective sides of a rectangular display region. A buffer member (14) which abuts on a back surface side thereof has a portion, which extends over a range of a side except both the end portions thereof, along at least one of the respective sides of the rectangular shape. Accordingly, deformation of the display panel is reduced and it is possible to prevent light leakage in a peripheral portion of the display screen.

5 Claims, 9 Drawing Sheets

(52) U.S. Cl.
    CPC ............ *G02F 2001/133317* (2013.01); *G02F 2201/503* (2013.01)

(58) Field of Classification Search
    USPC .......................................... 345/545; 349/155
    See application file for complete search history.

(56) References Cited

U.S. PATENT DOCUMENTS

| | | | |
|---|---|---|---|
| 8,804,322 B2* | 8/2014 | Kim .................. | G02F 1/133308 174/350 |
| 2002/0130998 A1* | 9/2002 | Kim .................. | G02F 1/133308 349/122 |
| 2005/0057703 A1* | 3/2005 | Tsubokura .......... | G02F 1/13394 349/58 |
| 2010/0149452 A1* | 6/2010 | Harada ................ | G02F 1/1333 349/58 |
| 2012/0063113 A1* | 3/2012 | Hisakawa ......... | G02F 1/133308 361/807 |
| 2014/0233203 A1 | 8/2014 | Ohtomo | |
| 2014/0362301 A1* | 12/2014 | Masuda ............... | G02B 6/0091 348/836 |
| 2015/0185411 A1* | 7/2015 | Ikuta .................... | G02B 6/0086 348/790 |

* cited by examiner (CROSS SECTION B-B)

(CROSS SECTION D-D)

DISPLAY APPARATUS

TECHNICAL FIELD

The present invention relates to a display apparatus that includes a display panel.

BACKGROUND ART

In the related art, there has been known a display apparatus in which a display panel is supported by holding a peripheral portion of the display panel from a front surface side and a back surface side of the display panel.

In this type of display apparatus, there has been known a case where, for example, a warp of the display panel or deformation of a frame that supports the display panel results in having a portion in which the display panel and the frame are in tight contact with each other and results in an occurrence of display unevenness. In particular, in a case where the display apparatus is increased in size and is decreased in thickness, the weight of the display panel or the like is likely to affect an occurrence of a warp of the display panel.

As a technique that reduces display unevenness due to the warp of the display panel or the deformation of the frame, for example, PTL 1 discloses a liquid crystal display apparatus having a configuration in which the frame holds a liquid crystal panel at portions except four corners of the rectangular liquid crystal panel such that the four corners of the liquid crystal panel are not held by the frame.

In other words, in the technique in PTL 1, it is noted that stress occurring between the liquid crystal panel and the frame due to, for example, the warp of the liquid crystal panel or the deformation of the frame is concentrated on the four corners of the liquid crystal panel, and thus, it is intended to reduce the concentration of stress by holding the liquid crystal panel at portions except the corners and thereby to reduce display unevenness due to the concentration of the stress at the corners.

CITATION LIST

Patent Literature

PTL 1: Japanese Unexamined Patent Application Publication No. 2013-164466 (Published on Aug. 22, 2013)

SUMMARY OF INVENTION

Technical Problem

However, in the technique in PTL 1 described above, since a gap is formed between the liquid crystal panel and the frame at the four corners of the liquid crystal panel, light leakage may be likely to occur between the liquid crystal panel and the frame at the four corners, particularly in a case where a periphery of the frame has a narrow width.

FIG. 9 illustrates views depicting light leakage between a liquid crystal panel and a frame, which occurs at four corners of the liquid crystal panel. Note that a configuration in FIG. 9 is not a configuration employed in a known technique, but is created by the present inventors so as to depict the light leakage described above.

As illustrated in FIG. 9(a), in a case where a width $W_P$ of a panel periphery as a region of a liquid crystal panel P on the periphery of a display region and a width $W_F$ of a frame periphery as a region of a frame F on the periphery of the display region are relatively large, an overlapped region between the frame F and the liquid crystal panel P has a wide width $W_{PF}$. Since light (for example, light from a backlight unit dispersed inside the display apparatus without being incident on the liquid crystal panel) from a bright region inside the display apparatus is blocked by the overlapped region between the frame and the liquid crystal panel, there is substantially no leakage of light to the outside of the display apparatus.

As illustrated in FIG. 9(b), however, in a case where the width $W_P$ of the panel periphery and the width $W_F$ of the frame periphery are relatively narrow, the overlapped region between the frame F and the liquid crystal panel P has the narrow width $W_{PF}$. Therefore, the light from the bright region inside the display apparatus is likely to leak to the outside from a gap between the frame and the liquid crystal panel.

The present invention is made in consideration of the problem described above, and an object thereof is to suppress display unevenness due to deformation of the display apparatus and to prevent leakage of light from the inside of a display apparatus in a peripheral portion of a display screen.

Solution to Problem

In order to solve the problem described above, a display apparatus according to an aspect of the present invention includes: a display panel that has a display region having a substantially rectangular shape and a panel periphery as a region on the periphery of the display region; a first member that abuts on the panel periphery from a front surface side; and a second member that abuts on the panel periphery from a back surface side. The display panel is held via both of the members. The first member and the second member extend along respective sides of the rectangular shape. The first member is made of a material having a light shielding property and has a portion, which extends over substantially the whole length of a side, along at least one of the respective sides of the rectangular shape. The second member has a portion, which extends over a range of a side except both the end portions of the side, along at least one of the respective sides of the rectangular shape.

Advantageous Effects of Invention

In the display apparatus according to the aspect of the present invention, the first member is made of a material having the light shielding property and has a portion which extends over substantially the whole length of a side along at least one of the respective sides of the rectangular shape. Accordingly, it is possible to prevent light leakage from occurring in the portion in which the first member extends over substantially the whole length of the side of the rectangular shape. In addition, the second member has a portion which extends over a range of the side except both the end portions thereof along at least one of the respective sides of the rectangular shape. In other words, the second member is not provided in a region facing the end portions. Accordingly, an external force applied to a corner of the display panel due to the weight, thermal contraction, vibration, or the like of the display panel is attenuated, and thus it is possible to prevent a display quality from deteriorating due to deviation of the display panel or a change in a thickness of a cell.

BRIEF DESCRIPTION OF DRAWINGS

FIG. 6(a) illustrates a buffer member that abuts on a display panel on a front surface side and FIG. 6(b) illustrates another buffer member that abuts on the display panel on a back surface side.

FIG. 7(a) illustrates a buffer member that abuts on a display panel on a front surface side and FIG. 7(b) illustrates another buffer member that abuts on the display panel on a back surface side.

FIG. 8(a) illustrates a buffer member that abuts on a display panel on a front surface side and FIG. 8(b) illustrates another buffer member that abuts on the display panel on a back surface side.

DESCRIPTION OF EMBODIMENTS

Embodiment 1

An embodiment of the present invention is described.

Figure 1:
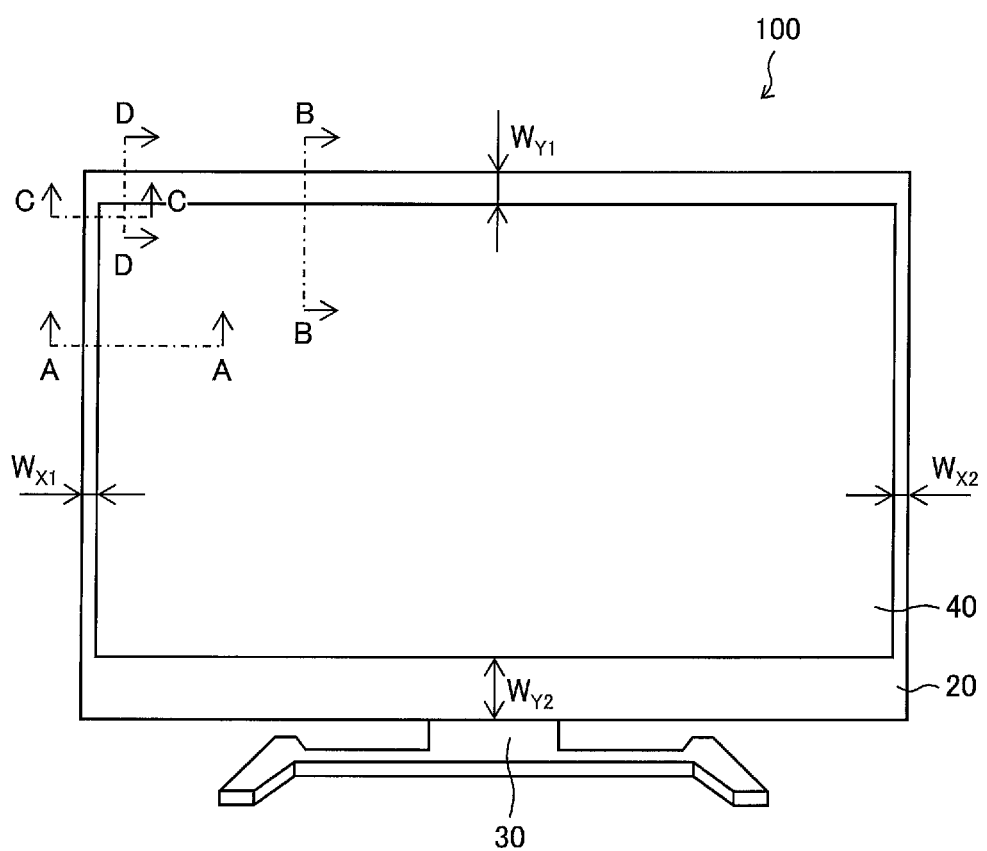
FIG. 1 is a view depicting the external appearance of a display apparatus according to Embodiment 1 of the present invention.

FIG. 1 is a view depicting the external appearance of a display apparatus 100 according to the embodiment. As illustrated in FIG. 1, the display apparatus 100 includes a display panel 10, a frame 20, and a stand 30.

The display panel 10 has a substantially rectangular shape when viewed in a direction normal to a display surface, and an image according to image data is displayed on a substantially rectangular display region of the display panel. There is no particular limitation to a configuration of the display panel 10, and it is possible to use a display panel known in the related art. In the embodiment, as the display panel 10, a transmissive liquid crystal display panel is used in which transmissibility of light incident from the back surface side is controlled for each pixel so that luminance of the light, which is emitted from the front surface side, is controlled for each pixel, and display is performed.

The frame 20 is disposed to cover a part of a peripheral portion (a panel periphery, as a non-display region, which is provided to surround the periphery of the substantially rectangular display region) of the display panel 10. Note that, in the embodiment, detailed description will be provided below, and the frame 20 and a panel support member 22 (refer to FIGS. 2 to 5 to be described below) which is provided in the display apparatus 100 are configured to hold and support the peripheral portion of the display panel 10 via a first buffer member (first member) 13 and a second buffer member (second member) 14 (refer to FIGS. 2 to 5 to be described below).

As the first buffer member 13, a material having a light shielding property against visible light and elasticity suitable for a buffer member may be used and it is possible to use a material known in the related art. In addition, as the second buffer member 14, a material having elasticity suitable for a buffer member may be used and it is possible to use a material known in the related art. In the embodiment, a microcellular polymer sheet (PORON (registered trademark)) produced by Rogers INOAC Corporation is used as the first buffer member 13 and the second buffer member 14.

There is no particular limitation to a material of the frame 20 as long as the material has a level of strength with which it is possible to support the display panel 10, and a frame made of aluminum is used in the embodiment.

The stand 30 is mounted on the floor or a mounting surface of an installation base or the like, and supports the display panel 10 and the frame 20. Note that, in the embodiment, as illustrated in FIG. 1, long opposite sides of the two sets of opposite sides of the rectangular shape of the display panel 10 are disposed on the upper side and the lower side in the vertical direction and short opposite sides are disposed on both sides in the horizontal direction.

In addition, in the embodiment, when the display panel 10 is viewed in the direction normal to the display surface, widths $W_{X1}$ and $W_{X2}$ of portions (frame peripheries) of the frame 20 on both sides in the horizontal direction of the display region are narrower than a width $W_{Y1}$ of a portion (frame periphery) of the display region on the upper side and a width $W_{Y2}$ of a portion thereof on the lower side.

Figure 2:
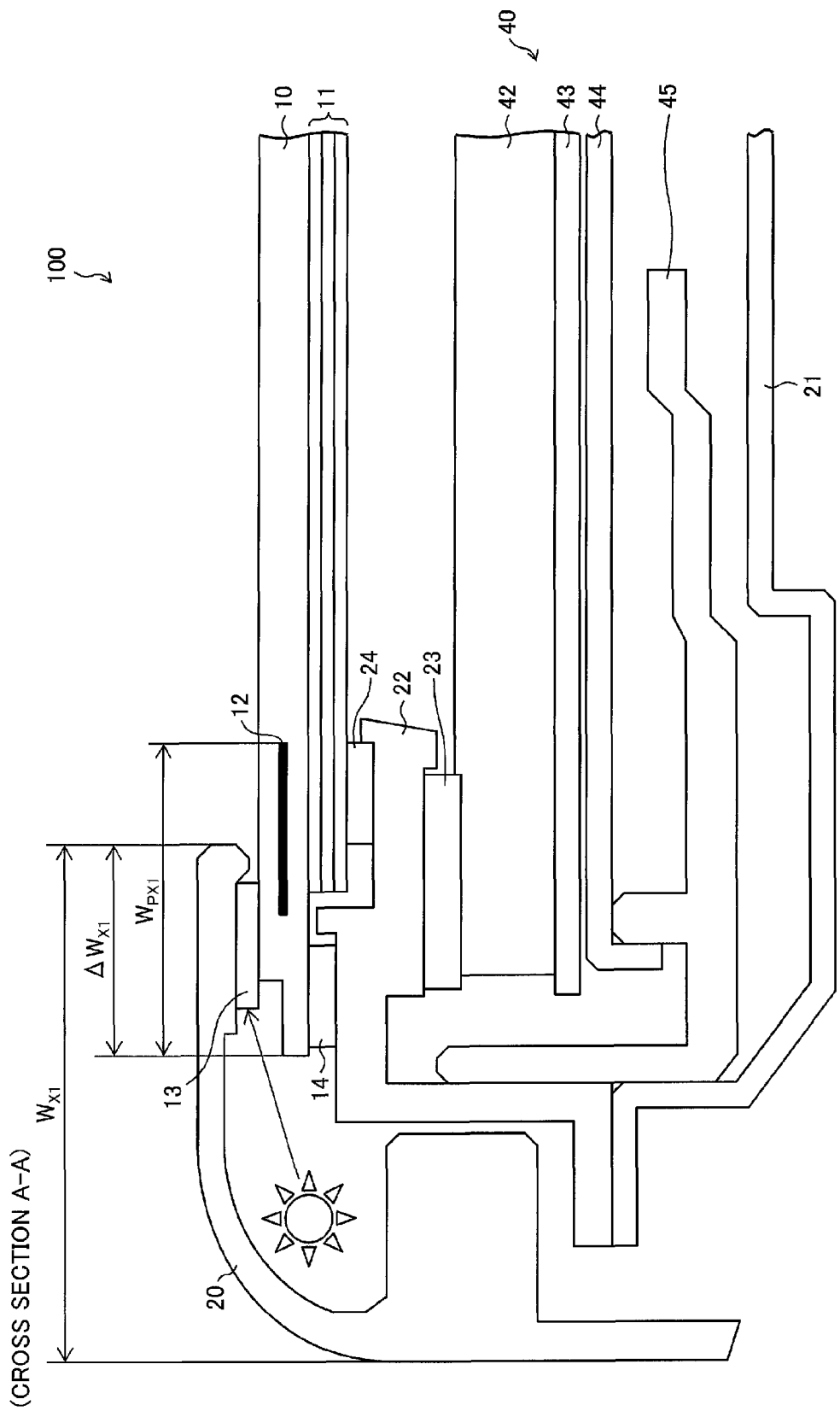
FIG. 2 is a sectional view taken along line A-A in FIG. 1.
Figure 3:
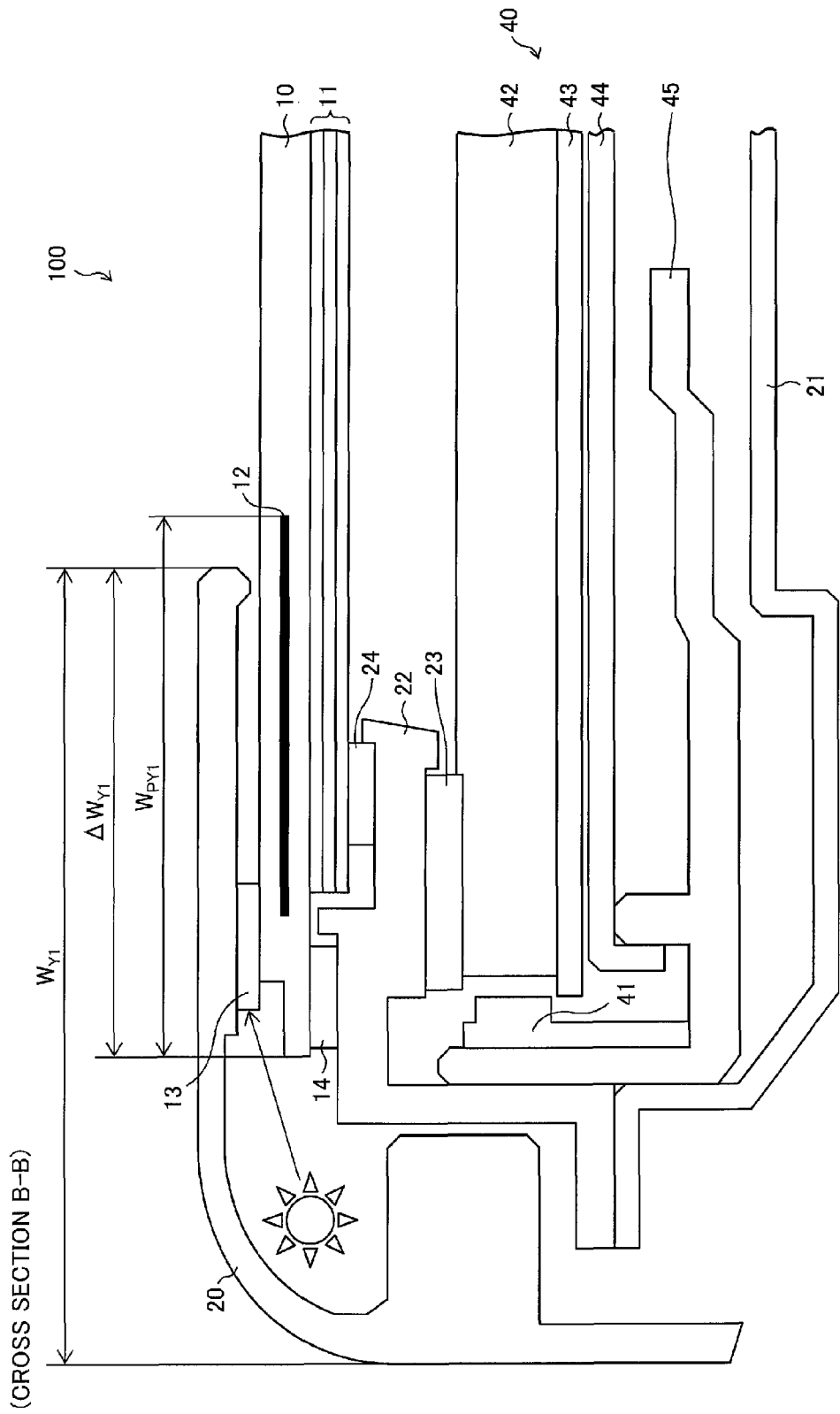
FIG. 3 is a sectional view taken along line B-B in FIG. 1.
Figure 4:
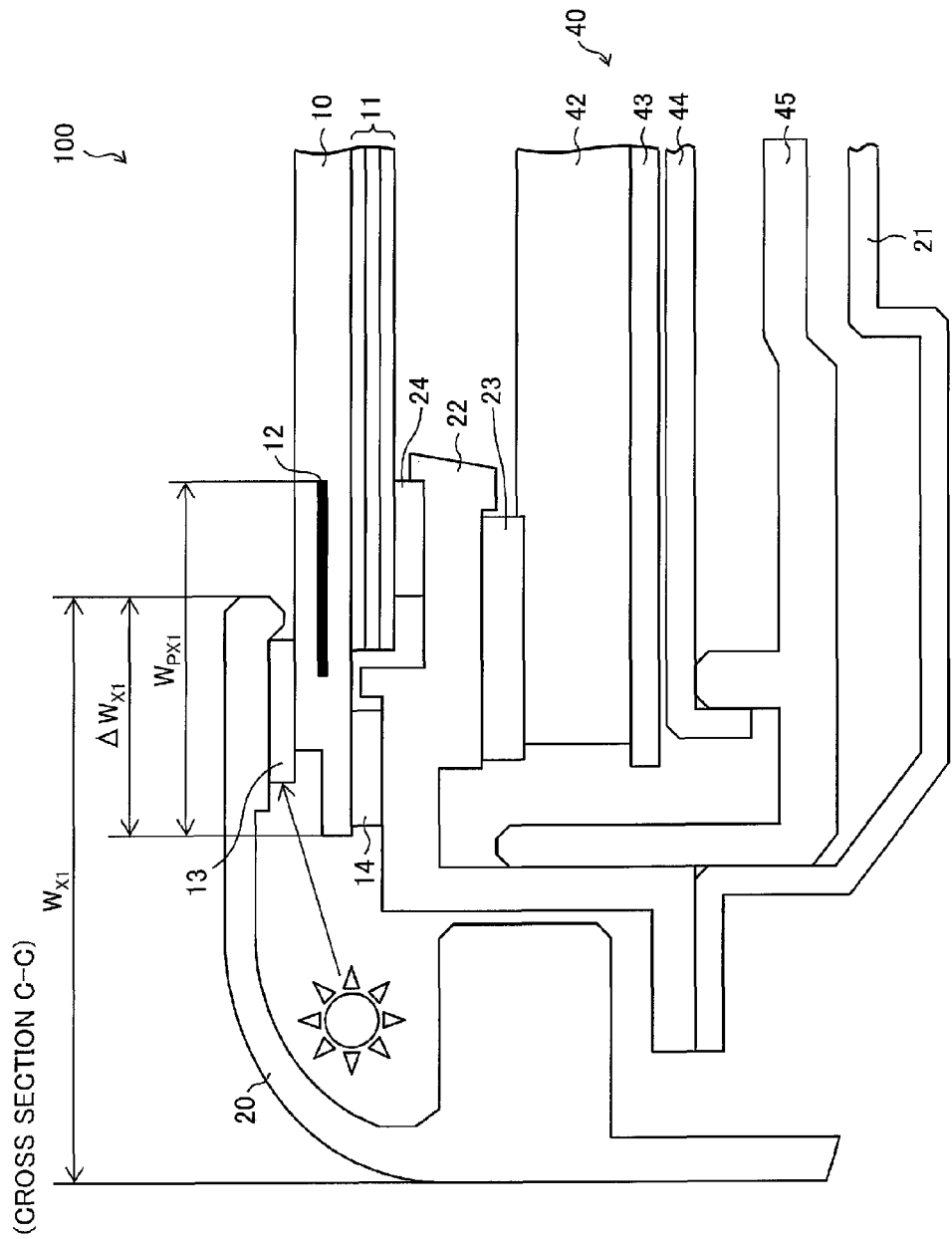
FIG. 4 is a sectional view taken along line C-C in FIG. 1.
Figure 5:
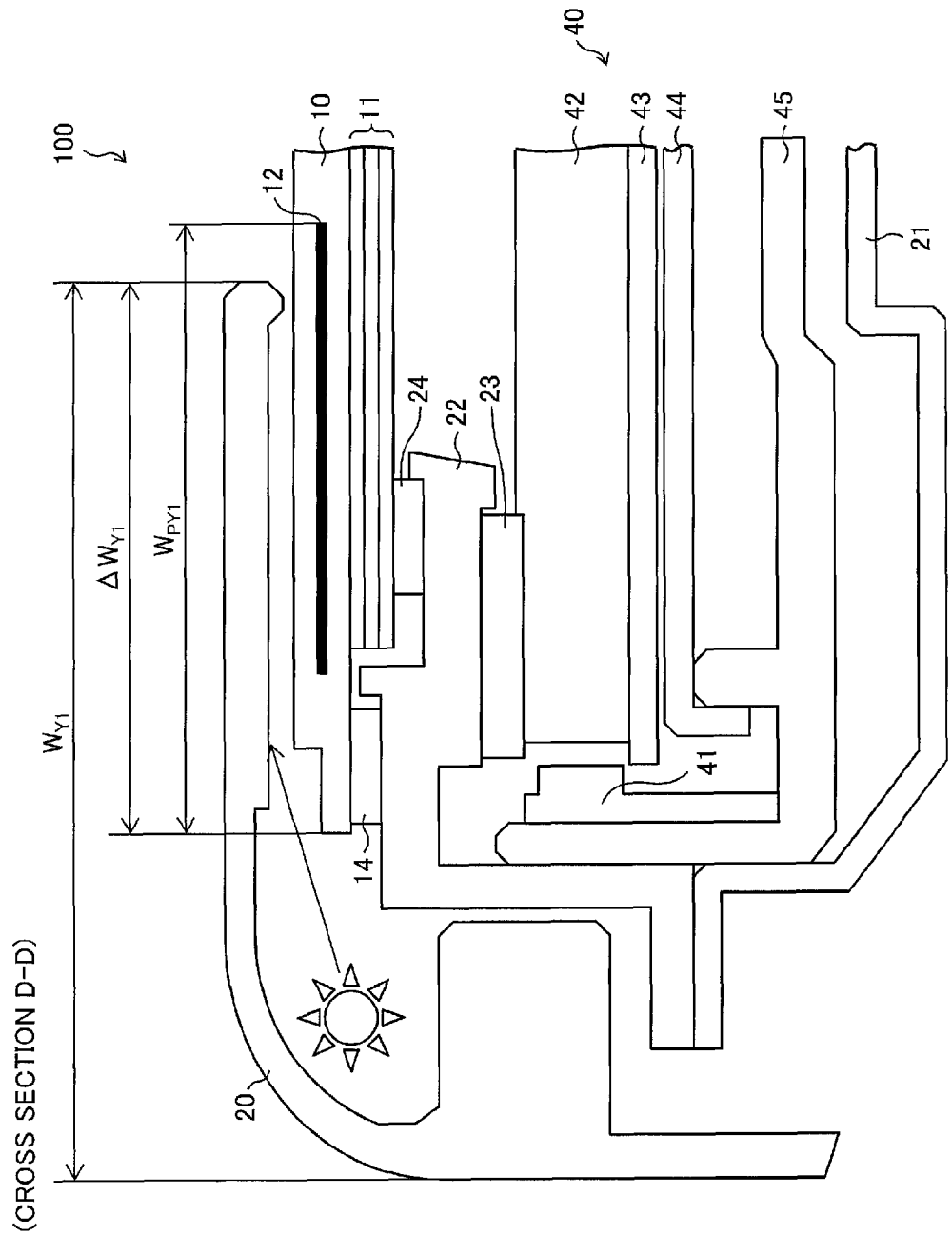
FIG. 5 is a sectional view taken along line D-D in FIG. 1.

FIG. 2 is a sectional view taken along line A-A in FIG. 1.
FIG. 3 is a sectional view taken along line B-B in FIG. 1.
FIG. 4 is a sectional view taken along line C-C in FIG. 1.
FIG. 5 is a sectional view taken along line D-D in FIG. 1.

As illustrated in FIGS. 2 to 5, the display apparatus 100 includes the display panel 10, the frame 20, a reinforcement angle 21, the panel support member 22, and a backlight unit 40. The backlight unit 40 includes a light source unit 41, a light guide plate 42, a reflective sheet 43, a backlight chassis 44, and a heatsink 45.

The frame 20 and the reinforcement angle 21 are attached to a main body (not shown) of the display apparatus 100. There is no particular limitation to the reinforcement angle 21 as long as the reinforcement angle has appropriate stiffness, and a reinforcement angle made of iron is used in the embodiment.

The panel support member 22 and the heatsink 45 are attached to the reinforcement angle 21. There is no particular limitation to a material of the panel support member 22, and a support member made of plastic is used in the embodiment. In addition, there is no particular limitation to the heatsink 45 as long as the heat dissipation plate is made of a material having high thermal conductivity, and a heatsink made of aluminum is used in the embodiment.

The light guide plate 42 is disposed to face the back surface of the display panel 10, and the reflective sheet 43 adheres to a surface of the light guide plate 42 on the side opposite to a surface facing the display panel 10. In addition, the backlight chassis 44 is disposed over the reflective sheet 43 on the side opposite to the side on which the light guide plate 42 is disposed, and the backlight chassis 44 supports the light guide plate 42 and the reflective sheet 43. There is no particular limitation to a material of the backlight chassis 44 as long as the material has appropriate stiffness, and a member made of iron is used in the embodiment. In addition, there is no particular limitation to a configuration of the light guide plate 42 and the reflective sheet 43, and it is possible to use a configuration known in the related art.

A part of the heatsink 45 abuts on a back surface (side opposite to the side on which the light guide plate 42 and the reflective sheet 43 are disposed) of the backlight chassis 44, and the panel support member 22 abuts on a front surface side (side on which the display panel 10 is disposed) of the light guide plate 42 via a buffer member (spacer) 23. Accordingly, the light guide plate 42, the reflective sheet 43, and the backlight chassis 44 are held and supported by the heatsink 45 and the panel support member 22.

As illustrated in FIGS. 3 and 5, the light source units 41 are provided to extend along the long sides of the two sets of opposite sides constituting the rectangular shape. In the embodiment, a light source unit including multiple light emitting diodes (LEDs) arranged in the long-side direction described above is used as the light source unit 41.

Note that, in the embodiment, the light source unit 41 is not provided at positions along the short sides of two sets of opposite sides constituting the rectangular shape, but the light source units 41 are disposed at positions along the long sides.

In addition, in the embodiment, the widths $W_{X1}$ and $W_{X2}$ of the frame 20 (frame periphery) corresponding to the short sides of the rectangular shape are narrower than the widths $W_{Y1}$ and $W_{Y2}$ of the long sides. Similarly, widths $W_{PX1}$ and $W_{PX2}$ of the peripheral portion (panel periphery) of the display panel 10 corresponding to the short sides of the rectangular shape are narrower than widths $W_{PY1}$ and $W_{PY2}$ of the long sides. Therefore, regarding a width of an overlapped region in which the frame 20 and the display panel 10 are overlapped when the display panel 10 is viewed in the direction normal to the display surface, widths $\Delta W_{X1}$ and $\Delta W_{X2}$ of the short sides are narrower than widths $\Delta W_{Y1}$ and $\Delta W_{Y2}$ of the long sides. Note that the widths $\Delta W_{X1}$ and $\Delta W_{X2}$ of the short sides may be different from each other. Note that the widths $\Delta W_{Y1}$ and $\Delta W_{Y2}$ of the long sides may be different from each other.

A sheet group 11 formed of a plurality of optical sheets (for example, polarizing films or color films) is disposed on a surface of the display panel 10 on the backlight unit 40 side, and the sheet group 11 abuts on the panel support member 22 via the buffer member (spacer) 24. In addition, multiple pixels (not shown) are formed in a matrix shape in the display region of the display panel 10, and a black matrix 12 that blocks light incident from the backlight unit 40 is disposed on the peripheral portion (panel periphery) of the display region so as to cover the periphery of the display region. In addition, end portions of the frame 20 in regions corresponding to respective sides of the rectangular shape of the display panel 10 extend to regions in which the end portions are overlapped with the black matrix 12 when viewed in the direction normal to the display surface. In addition, the first buffer member 13 is disposed at a position at which at least a part of the first buffer member 13 is overlapped with the black matrix 12 when viewed in the direction normal to the display surface.

The front surface side of the peripheral portion of the display panel 10 abuts on the frame 20 via the first buffer member 13, and the back surface side thereof abuts on the panel support member 22 via the second buffer member 14. Accordingly, the display panel 10 is held and supported by the frame 20 and the panel support member 22 via the first buffer member 13 and the second buffer member 14.

During display of an image, light emitted from the light source unit 41 enters the light guide plate 42 from a side (end) surface of the light guide plate 42, is reflected from the reflective sheet 43 or the like, and is emitted from the light guide plate 42 toward the display panel 10. The multiple pixels are provided in the display panel 10, and a display control unit (not shown) controls an orientation of liquid crystal molecules sealed in the pixels in response to image data. Accordingly, luminance of light that enters from the backlight unit 40 and is transmitted through the display panel 10 is controlled for each pixel, and an image according to the image data is displayed.

Heat generated in the light source unit 41 is dissipated by the heatsink 45 to a region on the back surface side (side opposite to the side on which the display panel 10 is provided) of the backlight unit 40. Accordingly, a change in temperature of the display panel 10 and the sheet group 11 due to the heat generated in the light source unit 41 is controlled and the display panel 10 is prevented from being deformed due to the change in temperature.

Figure 6:
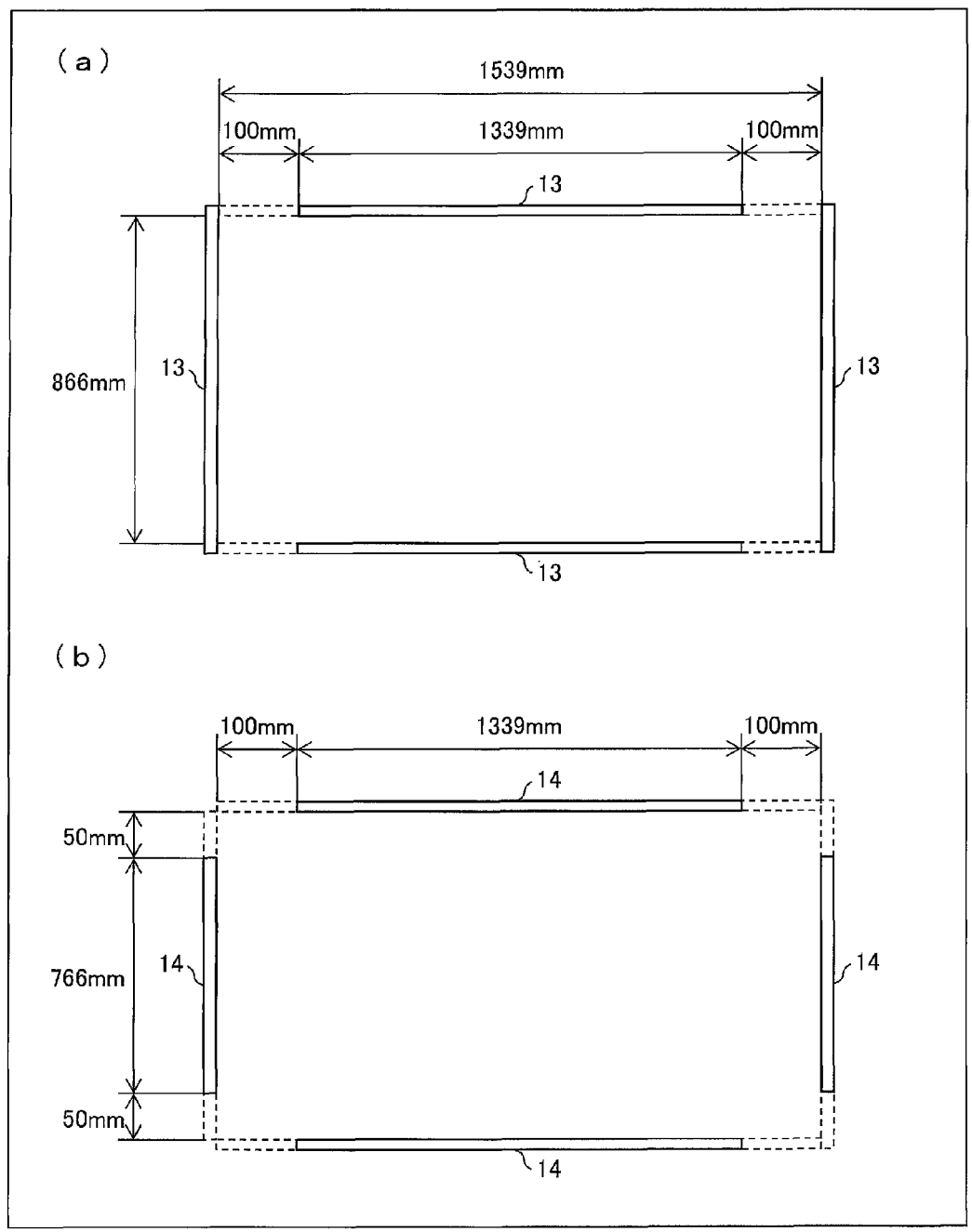
FIG. 6 includes sectional views indicating a configuration of a buffer member provided in the display apparatus illustrated in FIG. 1, where

FIG. 6(*a*) is a view depicting a shape of the first buffer members 13 (buffer members disposed between the frame 20 and the display panel 10) when viewed in the direction normal to the display surface, and FIG. 6(*b*) is a view depicting a shape of the second buffer members 14 (buffer members disposed between the display panel 10 and the panel support member 22) when viewed in the direction normal to the display surface.

As illustrated in FIG. 6(*a*), the first buffer members 13 extend along the respective sides of the rectangular display region of the display panel 10. The first buffer members 13 have portions along the short opposite sides of the two sets of opposite sides (short opposite sides and long opposite sides), which extend over substantially the whole length of the short opposite sides, and portions along the long opposite sides which extend over a range except both end portions of each of the opposite long sides.

In addition, as illustrated in FIG. 6(*b*), the second buffer members 14 extend along the portions except both of the end portions of each of the opposite sides in the rectangular display region of the display panel 10.

Specifically, the display region of the display panel 10 in the embodiment has the long side of 1,539 mm and the short side of 866 mm. The first buffer member 13 is disposed along substantially the whole length of the display region on the short side, and is not provided in a range of 100 mm from both ends of the display region, but along a portion of 1,339 mm at the central portion on the long side. In addition, the second buffer member 14 is not provided in a range of 50 mm from both the ends of the display region, but along a portion of 766 mm at the central portion on the short side, and is not provided in a range of 100 mm from both the ends of the display region, but along a portion of 1,339 mm at the central portion on the long side.

Accordingly, as illustrated in FIGS. 2 and 3, both of the first buffer members 13 and the second buffer members 14 are disposed at positions along the central portions of the respective sides of the rectangular display region of the display panel 10. In addition, the first buffer members 13 are disposed in the vicinity of both of the end portions (vicinity of the corners of the rectangular shape) of the short sides of the rectangular shape, whereas the second buffer members 14 are not disposed therein. In addition, neither the first buffer members 13 nor the second buffer members 14 are disposed in the vicinity of both of the end portions (vicinity of the corners of the rectangular shape) of the long sides of the rectangular shape.

As described above, the display apparatus 100 according to the embodiment is configured to include the frame 20 and the panel support member 22 which hold the display panel 10 via the first buffer member 13 and the second buffer member 14, and, regarding the widths of the overlapped region between the panel periphery and the frame periphery in a direction perpendicular to a side corresponding to the overlapped region, the width of the short side of the rectangular shape is narrower than the width of the long side thereof. In addition, the first buffer members 13 disposed between the frame 20 and the display panel 10 and the second buffer members 14 disposed between the display panel 10 and the panel support member 22 extend along the respective sides of the rectangular shape. In addition, the first buffer members 13 are made of a material having a light shielding property and have portions along the short opposite sides of the two sets of the opposite sides of the rectangular shape, which extend over substantially the whole length of the opposite sides. In addition, the second buffer members 14 extend along portions except both of the end portions of each of the sides of the rectangular shape.

Accordingly, since the overlapped region between the panel periphery and the frame periphery on the short sides of the rectangular shape has a narrow width, light leakage is likely to occur between the display panel 10 and the frame 20, however, since the first buffer members 13 are disposed over substantially the whole length of the short sides, it is possible to prevent the light leakage.

Figure 9:
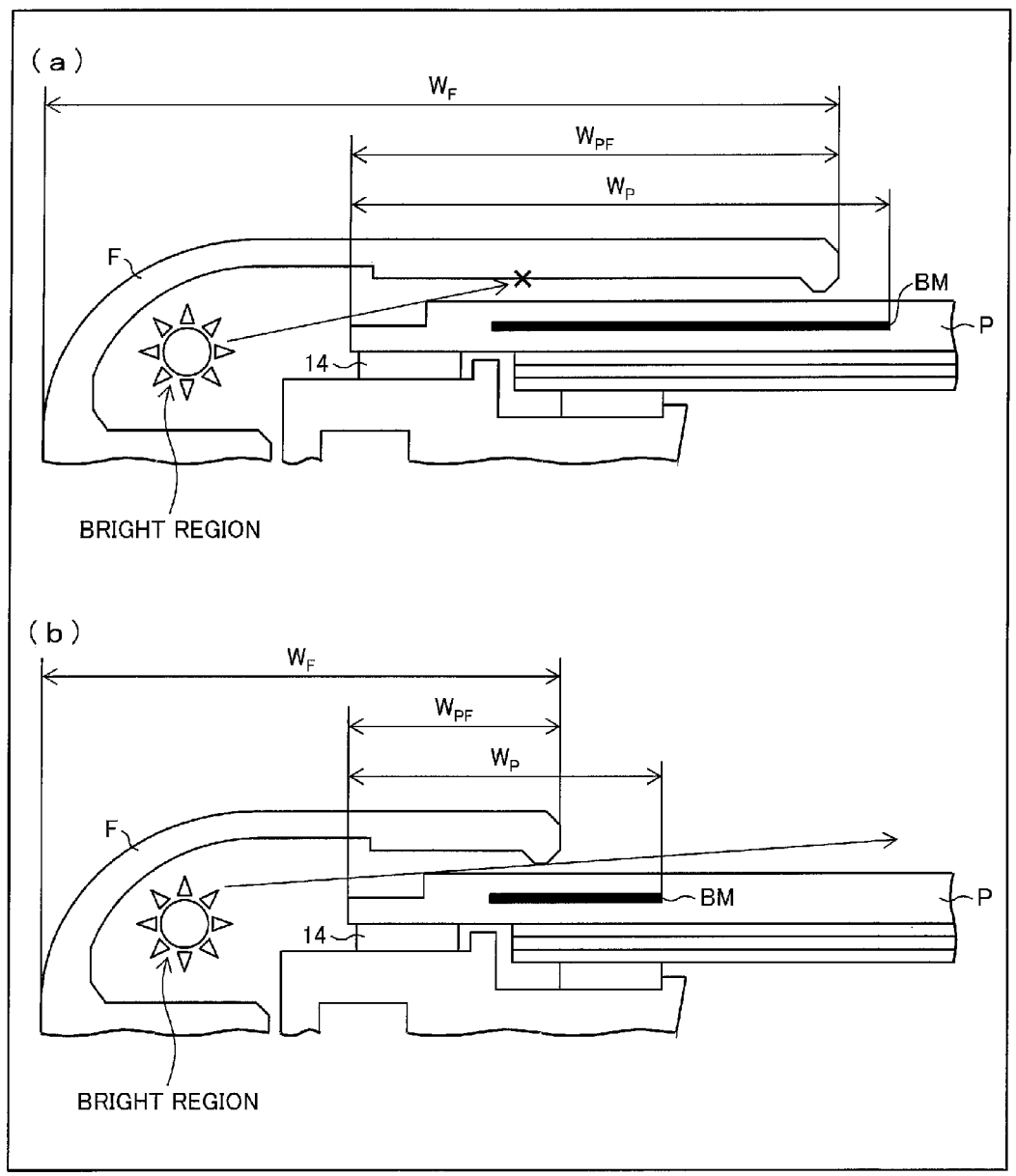
FIG. 9 illustrates views depicting light leakage from a portion between a liquid crystal panel and a frame, which occurs at four corners of the liquid crystal panel.

Note that the overlapped region between the panel periphery and the frame periphery has a relatively wide width in the region corresponding to the long-side portions of the rectangular shape. Therefore, the first buffer members 13 are not provided in the regions corresponding to both of the end portions of the long-side portions, however, similarly to the case in FIG. 9(a) described above, light leakage may be substantially prevented between the frame 20 and the display panel 10.

In addition, the second buffer members 14 extend to face the portions except both of the end portions of each of the sides of the rectangular shape. Accordingly, an external force applied to a corner of the display panel 10 due to the weight, thermal contraction, vibration, or the like of the display panel 10 is attenuated, and thus it is possible to prevent a display quality from deteriorating due to deviation of the display panel 10 or a change in a thickness of a cell. In other words, when warp or deformation occurs due to the weight, the thermal contraction, or the like of the display panel 10, stress is concentrated on the corners of the display panel 10, the display panel 10 is subjected to great stress at the corners, the thickness of the cell is changed or a polarizing plate is deformed, and white spots appear in the vicinity of the corners during black display, which results in deterioration of the display quality, in some cases. On the contrary, in the display apparatus 100 according to the embodiment, external force applied to the corners of the display panel 10 is attenuated and thus, it is possible to prevent the display quality from deteriorating due to the deviation of the display panel 10 or the change in the thickness of the cell.

Embodiment 2

Another embodiment of the present invention is described. Note that the same reference signs as in Embodiment 1 are assigned to the members having the same functions as in Embodiment 1, for the convenience of the description, and description thereof is omitted.

Figure 7:
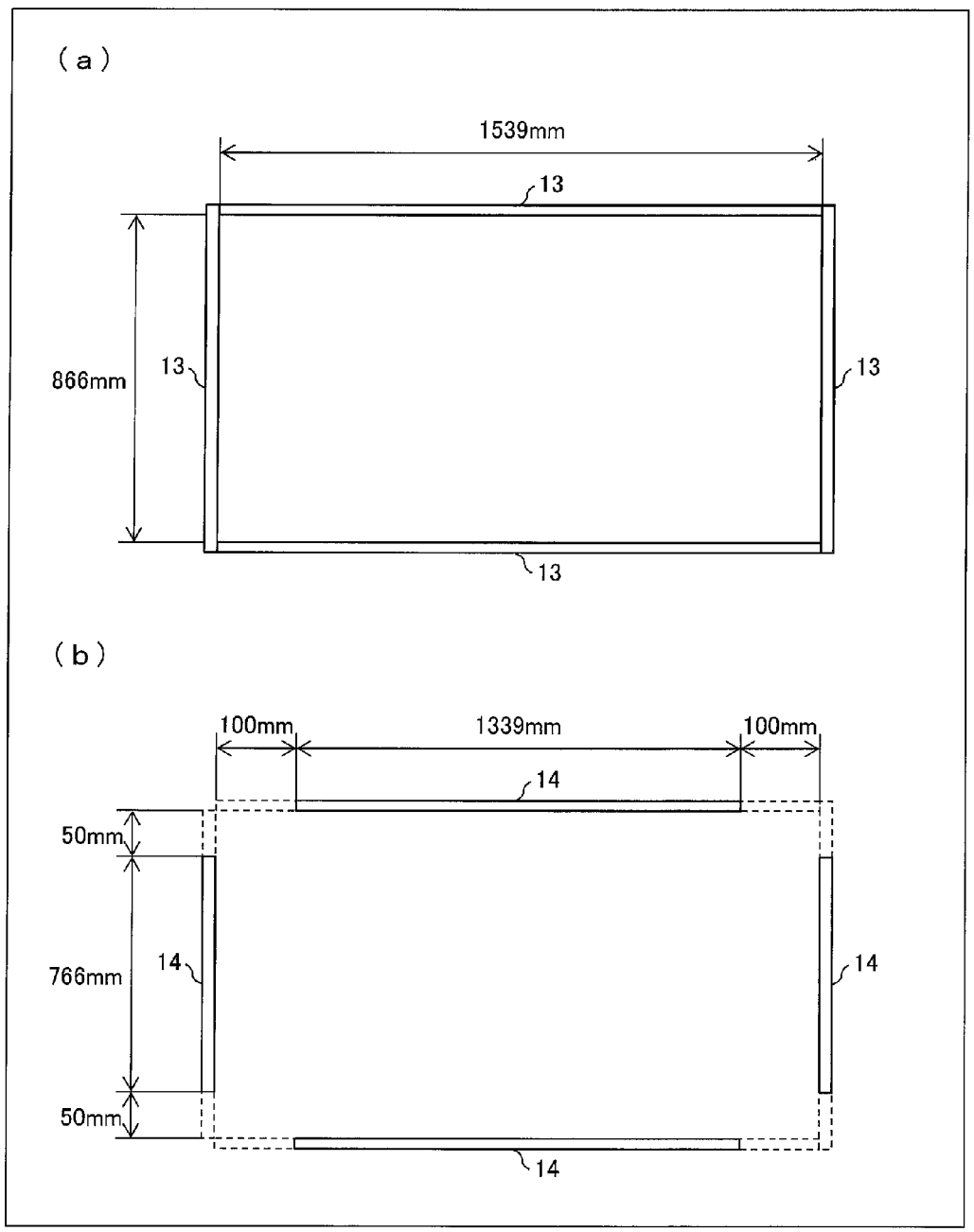
FIG. 7 includes sectional views indicating a configuration of a buffer member provided in a display apparatus according to Embodiment 2, where

FIG. 7(a) is a view depicting a shape of the first buffer members 13 in the display apparatus 100 according to the embodiment when viewed in the direction normal to the display surface, and FIG. 7(b) is a view depicting a shape of the second buffer members 14 when viewed in the direction normal to the display surface.

As illustrated in FIG. 7(a), the embodiment differs from Embodiment 1 in that the first buffer members 13 extend along substantially the whole length of the respective sides of the rectangular display region. The other configurations are the same as those in Embodiment 1.

Note that the first buffer member 13 has a fine gap provided between a portion along the long side of the rectangular display region and a portion along the short side thereof, in consideration of, for example, a dimensional tolerance of the portions. In other words, the first buffer member 13 is divided into portions each corresponding to a side of the rectangular shape. However, the configuration of the first buffer member 13 is not limited thereto, and the first buffer member may be formed integrally in a circumferential direction of the rectangular shape.

As described above, in the embodiment, the first buffer members 13 are disposed to extend over substantially the whole length of the sides, that is, not only along the short sides of the rectangular display region but also along the long sides. Accordingly, in addition to obtaining almost the same effects as in Embodiment 1, it is possible to more reliably prevent light leakage from occurring between the frame 20 and the display panel 10 in the long sides of the display region.

In addition, since the first buffer members 13 are disposed along substantially the whole of the periphery of the display region, it is possible to appropriately prevent dust, dirt, a bug, or the like from entering the inside of the display apparatus 100 through a gap between the frame 20 and the display panel 10.

In addition, the first buffer members 13 are disposed along substantially the whole of the periphery of the display region, thereby making it possible to reliably prevent the light leakage from occurring between the frame 20 and the display panel 10, even in a case where the overlapped regions (regions of being overlapped when viewed in the direction normal to the display surface) between the frame 20 and the display panel 10 have a narrow width in all of the long and short sides.

Embodiment 3

Still another embodiment of the present invention is described. Note that the same reference signs as in Embodiment 1 are assigned to the members having the same functions as in Embodiment 1, for the convenience of the description, and description thereof is omitted.

Figure 8:
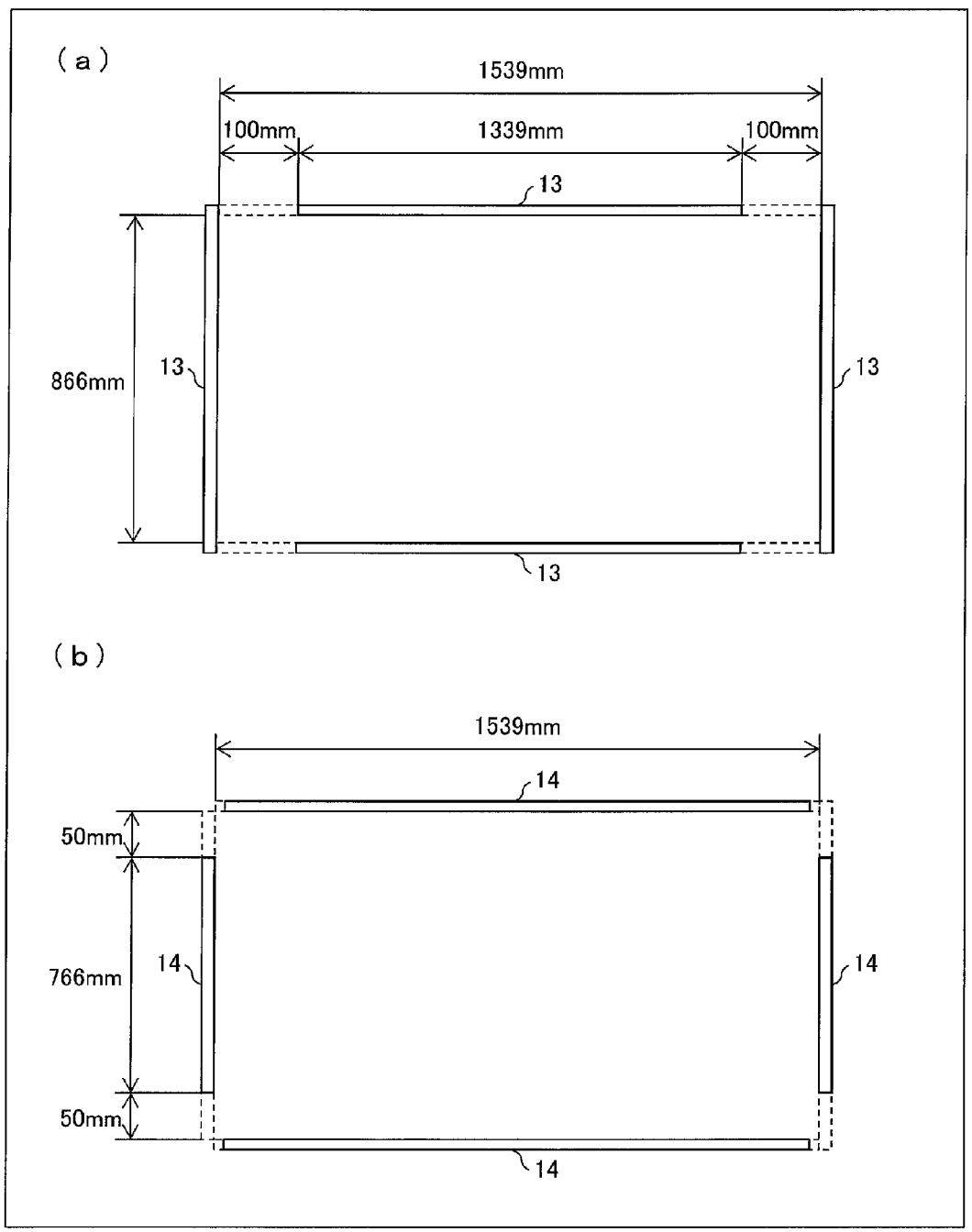
FIG. 8 includes sectional views indicating a configuration of a buffer member provided in a display apparatus according to Embodiment 3, where

FIG. 8(a) is a view depicting a shape of the first buffer members 13 in the display apparatus 100 according to the embodiment when viewed in the direction normal to the display surface, and FIG. 8(b) is a view depicting a shape of the second buffer members 14 when viewed in the direction normal to the display surface.

As illustrated in FIG. 8(b), the embodiment differs from Embodiment 1 in that portions of the second buffer members 14 corresponding to the long sides extend along substantially the whole length of the opposite sides, respectively, of the two sets of the opposite sides of the rectangular display region, and portions thereof corresponding to the short sides extend along portions except both end portions of each of the opposite sides. The other configurations are the same as those in Embodiment 1.

As described above, in the embodiment, one of the first buffer member 13 and the second buffer member 14 is disposed in the vicinity of end portions of each of the sides of the rectangular display region (vicinity of the corners of the rectangular shape), and the other member is not disposed. In other words, the second buffer member 14 is not provided in a portion in which the first buffer member 13 extends to both end portions of the side of the rectangular shape, and the first buffer member 13 is not provided in a portion in which the second buffer member 14 extends to both end portions of the side of the rectangular shape.

Therefore, the display panel 10 is not held between the frame 20 (first buffer member 13) and the panel support member 22 (second buffer member 14) in the vicinity of the corners of the rectangular shape. Accordingly, an external force applied to a corner of the display panel 10 due to the weight, thermal contraction, vibration, or the like of the display panel 10 is attenuated, and thus it is possible to prevent a display quality from deteriorating due to deviation of the display panel 10 or a change in a thickness of a cell.

Note that dimensions of each portion of the display panel 10 in the embodiments described above are set as an example, and the dimensions may be appropriately modified.

In addition, in the embodiment, the long opposite sides of the rectangular display region are disposed on the upper side and the lower side in the vertical direction and the short opposite sides thereof are disposed on both sides in the horizontal direction, however, the disposition is not limited thereto. For example, the long opposite sides of the rectangular display region may be disposed on both sides in the horizontal direction and the short opposite sides thereof may be disposed on the upper side and the lower side in the vertical direction. Alternatively, the respective sides of the rectangular display region may be disposed to be obliquely provided with respect to the vertical direction and the horizontal direction.

Note that, in any of the dispositions above, it is preferable that the first buffer member 13 is disposed to extend over substantially the whole length of the side having a narrower width of the overlapped region between the frame 20 and the display panel 10 (side having a width of the overlapped region, with which the light leakage is likely to occur in a case where the first buffer member 13 is not provided) than other sides, among the sides of the rectangular shape. Accordingly, it is possible to appropriately prevent the light leakage even from a side having a narrow width of the overlapped region described above.

In addition, in the embodiments above, the configuration, in which both of the short sides of the opposite sides of the rectangular display region have narrow widths of the overlapped region between the frame 20 and the display panel 10, is described, however, the configuration is not limited thereto. For example, a configuration, in which the overlapped region described above in one or more sides among the sides of the rectangular display region may have narrow widths, may be employed, and, in this case, a configuration, in which the first buffer members 13 extend along substantially the whole length of the sides having the narrow width described above.

In addition, in the embodiments described above, an example of a case where the present invention is applied to the display apparatus including the display panel is described, however, the embodiment is not limited thereto. For example, the present invention can be applied to a display apparatus including a plasma display panel, or an organic EL display panel, instead of the display panel.

CONCLUSION

A display apparatus (100) according to Aspect 1 of the present invention includes: a display panel (10) that has a display region having a substantially rectangular shape and a panel periphery as a region on the periphery of the display region; a first member (first buffer member 13) that abuts on the panel periphery from a front surface side; and a second member (second buffer member 14) that abuts on the panel periphery from a back surface side, in which the display panel (10) is held via both of the members (first buffer member 13 and second buffer member 14), the first member (first buffer member 13) and the second member (second buffer member 14) extend along respective sides of the rectangular shape, the first member (first buffer member 13) has a light shielding property and a portion, which extends over substantially the whole length of a side, along at least one of the respective sides of the rectangular shape and the second member (second buffer member 14) has a portion, which extends over a range of a side except both the end portions thereof, along at least one of the respective sides of the rectangular shape.

In this configuration, the first member (first buffer member 13) has the light shielding property and the portion, which extends over substantially the whole length of a side, along at least one of the respective sides of the rectangular shape. Accordingly, it is possible to prevent the light leakage from occurring in the portion in which the first member (first buffer member 13) extends over substantially the whole length of the side of the rectangular shape. In addition, the second member (second buffer member 14) has the portion, which extends over a range of a side except both the end portions thereof, along at least one of the respective sides of the rectangular shape. In other words, the second member (second buffer member 14) is not provided in a region facing both of the end portions. Accordingly, an external force applied to a corner of the display panel (10) due to the weight, thermal contraction, vibration, or the like of the display panel (10) is attenuated, and thus it is possible to prevent a display quality from deteriorating due to deviation of the display panel (10) or a change in a thickness of a cell.

The display apparatus (100) of Aspect 2 of the present invention, according to Aspect 1, has a configuration in which a part of regions of the panel periphery corresponding to the respective sides of the rectangular shape has a width in a direction perpendicular to a side corresponding to the region, the width being narrower than a width of another region in a direction perpendicular to a side corresponding to the other region, and the first member (first buffer member 13) disposed in the region having the width narrower than the other region extends over substantially the whole length of the side of the rectangular shape corresponding to the region.

The light leakage is likely to occur from the inside of the display apparatus (100) in the portion in which the panel periphery has a narrow width, however, in this configuration, it is possible to prevent the light leakage from occurring in the portion.

The display apparatus (100) of Aspect 3 of the present invention, according to Aspect 1 or 2, has a configuration in which the first member (first buffer member 13) has a portion, which extends over substantially the whole length of a side, along one or more of the respective sides of the rectangular shape and a portion, which extends over a range of a side except both the end portions thereof along the rest of the sides.

In this configuration, it is possible to prevent the light leakage from occurring in the portion in which the first member (first buffer member 13) extends over substantially the whole length of the side of the rectangular shape.

The display apparatus (100) of Aspect 4 of the present invention, according to Aspect 1 or 2, has a configuration in which the first member (first buffer member 13) has portions, which extend over substantially the whole length of sides, along the respective sides of the rectangular shape.

In this configuration, it is possible to prevent the light leakage from occurring substantially in the whole periphery of the display region.

The display apparatus (100) of Aspect 5 of the present invention, according to any one of Aspects 1 to 4, has a configuration in which the second member (second buffer member 14) extends over a range of a side except both the end portions thereof, in the portion in which the first member (first buffer member 13) extends over substantially the whole length of the sides of the rectangular shape.

In this configuration, the second member (second buffer member 14) is not provided in the portion in which the first member (first buffer member 13) extends over substantially the whole length of the side of the rectangular shape. Accordingly, an external force applied to a corner of the display panel (10) due to the weight, thermal contraction, vibration, or the like of the display panel (10) is attenuated, and thus it is possible to prevent a display quality from deteriorating due to deviation of the display panel (10) or a change in a thickness of a cell.

The present invention is not limited to the embodiments described above, various types of modification can be performed on the present invention within a range of claims, and an embodiment obtained by appropriately combining types of technical means described in different embodiments, respectively, is included in a technical range of the present invention. Further, types of technical means described in embodiments, respectively, are combined, thereby making it possible to form a new technical feature.

INDUSTRIAL APPLICABILITY

According to the present invention, it is possible to apply a display apparatus that includes a display panel.

REFERENCE SIGNS LIST

10 DISPLAY PANEL
11 SHEET GROUP
12 BLACK MATRIX
13 FIRST BUFFER MEMBER (FIRST MEMBER)
14 SECOND BUFFER MEMBER (SECOND MEMBER)
20 FRAME
21 REINFORCEMENT ANGLE
22 PANEL SUPPORT MEMBER
23, 24 BUFFER MEMBER
30 STAND
40 BACKLIGHT UNIT
41 LIGHT SOURCE UNIT
42 LIGHT GUIDE PLATE
43 REFLECTIVE SHEET
44 BACKLIGHT CHASSIS
45 HEATSINK
100 DISPLAY APPARATUS $W_{X1}, W_{X2}, W_{Y1}, W_{Y2}$ WIDTH OF FRAME PERIPHERY
$W_{PX1}, W_{PX2}, W_{PY1}, W_{PY2}$ WIDTH OF PANEL PERIPHERY
$\Delta W_{X1}, \Delta W_{X2}, \Delta W_{Y1}, \Delta W_{Y2}$ WIDTH OF OVERLAPPED PORTION BETWEEN FRAME PERIPHERY AND PANEL PERIPHERY

The invention claimed is:

1. A display apparatus comprising:
a display panel that has a display region having a substantially rectangular shape and a panel periphery as a region on the periphery of the display region;
a first member that abuts on the panel periphery from a front surface side; and
a second member that abuts on the panel periphery from a back surface side,
wherein the display panel is held via both of the members,
the first member and the second member extend along respective sides of the rectangular shape,
the first member is made of a material having a light shielding property and has a portion, which extends over substantially the whole length of a side, along at least one of the respective sides of the rectangular shape, and
the second member has a portion, which extends over a range of a side except both the end portions of the side, along at least one of the respective sides of the rectangular shape, wherein the second member extends over a range of a side except both the end portions of the side, in the portion in which the first member extends over substantially the whole length of the sides of the rectangular shape.

2. The display apparatus according to claim 1, wherein a part of regions of the panel periphery corresponding to the respective sides of the rectangular shape has a width in a direction perpendicular to a side corresponding to the region, the width being narrower than a width of another region in a direction perpendicular to a side corresponding to the other region, and
the first member disposed in the region having the width narrower than the other region extends over substantially the whole length of the side corresponding to the region.

3. The display apparatus according to claim 1,
wherein the first member has a portion, which extends over substantially the whole length of a side, along one or more of the respective sides of the rectangular shape and a portion, which extends over a range of a side except both the end portions of the other side, along the rest of the sides.

4. The display apparatus according to claim 1,
wherein the first member has portions, which extend over substantially the whole length of sides, along the respective sides of the rectangular shape.

5. The display apparatus according to claim 1,
wherein the first member and the second member are buffer members.

* * * * *